Jan. 3, 1939.   F. F. HENRIOT   2,142,314
BATTERY TESTING CLIP
Filed Jan. 6, 1937
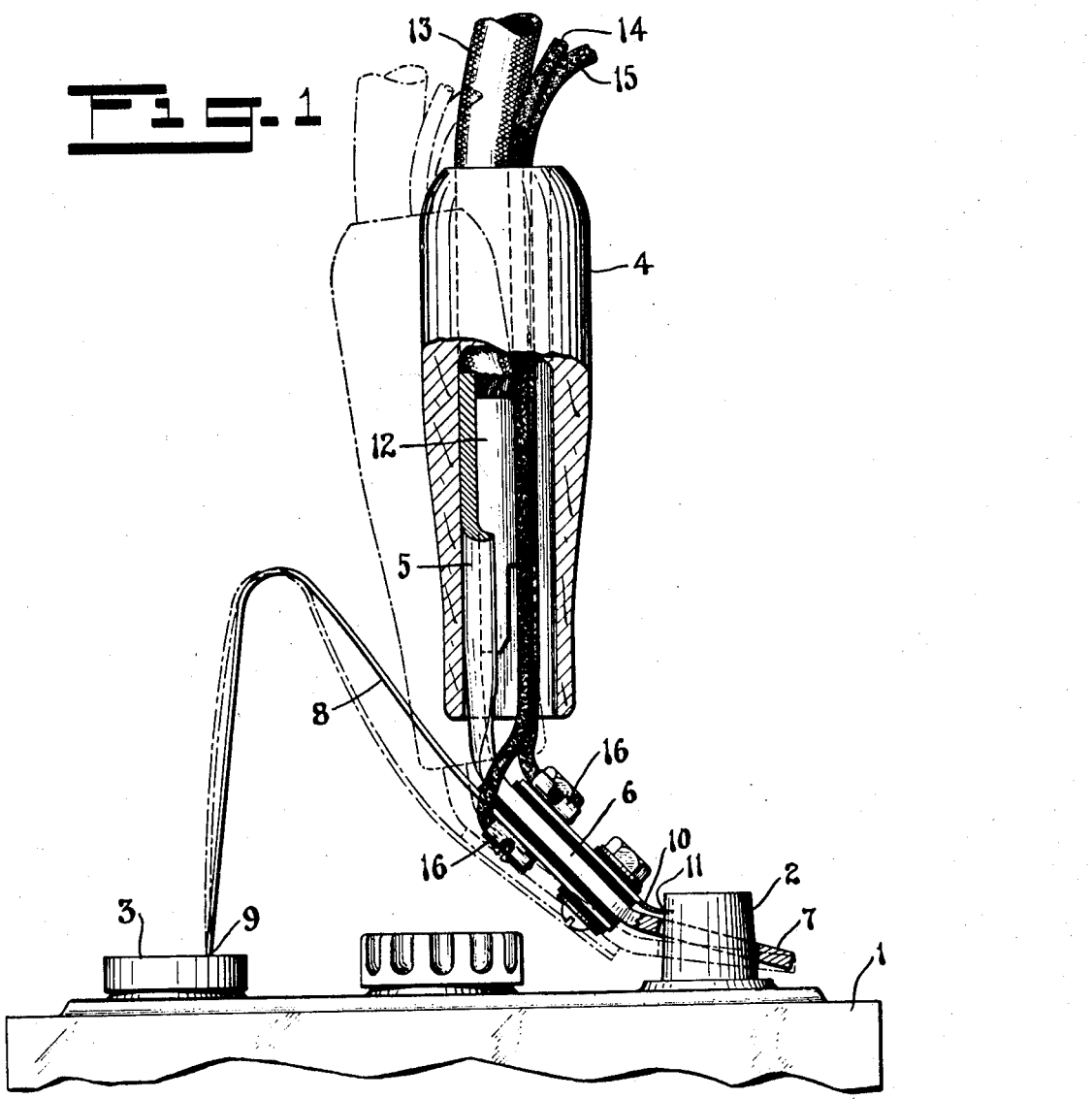
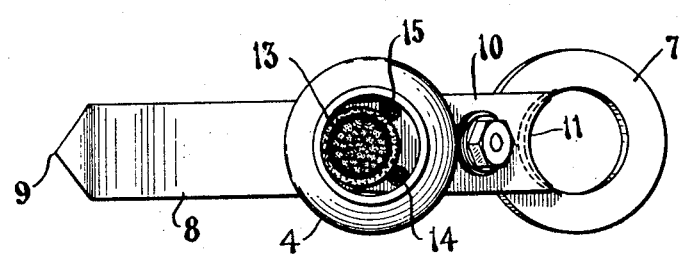
INVENTOR.
Floyd F. Henriot
BY
ATTORNEY.

Patented Jan. 3, 1939

2,142,314

UNITED STATES PATENT OFFICE 2,142,314

BATTERY TESTING CLIP

Floyd F. Henriot, Klamath Falls, Oreg., assignor to Benjamin F. W. Heyer, Tenafly, N. J.

Application January 6, 1937, Serial No. 119,248

6 Claims. (Cl. 173—324)

My invention relates to improvements in battery testing clips intended for use in connection with the testing of storage batteries, as disclosed in Heyer Patent No. 1,520,865, dated December 30, 1924, wherein voltage readings of such batteries are obtained under a simulated load, whereby the condition of the cell may be determined.

The invention is particularly adapted for use in connection with the testing of automobile batteries, which are generally assembled in groups of three cells. The negative terminal of one outside cell and the positive terminal of the other outside cell are formed as posts from which lead the supply cables to the starting and lighting circuits. The other terminals of all the cells are connected in series by so-called straps.

It is the present practice to make use of two clips for testing such batteries, one clip engaging the positive post and the other the negative post, said clips being in circuit with a suitable ammeter and variable resistance, usually a carbon pile, whereby a current reading of the desired value can be obtained, representing load conditions.

Also each clip provides for obtaining voltage readings between the two terminals of each outside cell, as well as between the two terminals of the central cell, whereby the condition of each cell may be ascertained.

The object of my invention is to provide a battery testing clip of simple, cheap and effective construction, of great durability, one that can be readily applied and removed and wherein the application of the clip in position results in the penetration of any extraneous coating on the terminals, whereby the electrodes or contacting members of the clip will be brought into effective engagement with the metal of the battery terminals, thus giving accurate readings.

With my improved battery testing clip I employ a generally ring-shaped electrode rigidly carried by a suitable handle and from which extends one of the cables in the circuit which includes the ammeter and variable resistance. By means of said handle the ring electrode may be forced down over the battery post, thereby effectively scraping or removing any deposit thereon so that said electrode will be brought into good electrical contact with the metal of the post.

The structure so far referred to carries a voltage electrode made of spring metal having preferably a pointed end and adapted to engage the other terminal of the same cell. In forcing down the first mentioned electrode over the battery post as explained, the second or voltage electrode will be placed under tension and at the same time will dig through any deposit on the terminal with which it cooperates, whereby good electrical contact will be made with the metal thereof. When pressure on said handle is released the resilience of the second or voltage electrode will cause the ring like electrode to tilt slightly so as to rigidly grip the terminal post, whereby the resiliency of the second electrode will hold the clip as a whole rigidly in place.

Preferably a third electrode is used also carried by the structure first mentioned, and adapted to make wiping contact with the terminal post, whereby voltage readings may be obtained between the second and third electrodes on the outside cells and also between the second electrodes of the two clips, whereby the voltage of the central cell may be read.

In order that the invention may be better understood attention is directed to the accompanying drawing forming a part hereof and in which Figure 1 is a side view of a portion of a typical storage battery cell with my improved clip applied thereto, the clip being shown partly in section. In this view I show in dotted lines the position of the clip while it is being applied and in full lines its position after the handle has been released and when the clip is secured in place ready for readings to be taken.

Figure 2 is a plan view of the clip removed from the battery. In both of these views corresponding parts are represented by the same numerals.

In Figure 1, I represents the upper portion of a typical storage battery having a terminal post 2 slightly tapered as shown and a second terminal 3, usually a strap connected to one terminal of the central cell. The clip includes a handle 4 made preferably of wood or of some suitable molded insulating material, said handle having a central bore within which is secured in any suitable way a channelled member 5, formed with a flat extension 6 below the handle, arranged at an angle thereto as shown.

The lower end of the extension 6 is formed as a ring 7 or substantially so of somewhat greater internal diameter than the maximum diameter of the post 2 as shown.

Carried on the under side of the extension 6 and insulated therefrom as shown, is a second electrode 8 made of spring steel or other highly resilient metal, of a generally inverted U-form as indicated in Figure 1. The end of this second electrode is preferably pointed at 9 (see Figure 2)

whereby the pointed end of the second electrode will be brought into electrical contact with the terminal 3 when the clip is being applied.

Preferably a third electrode 10 is secured to the upper face of the extension 6 but insulated therefrom as indicated in Figure 1. This third electrode 10 is formed with a rounded surface 11 as shown which makes wiping contact with the post when the clip is being applied.

A tubular terminal 12 is soldered or otherwise secured to the channelled member 5 and within the upper end of this terminal are soldered the wires of the cable 13 leading to the ammeter and associated elements. Wires 14, 15 lead from the second and third electrodes, respectively, to the desired voltmeter and are preferably secured at their lower ends to said electrodes by means of sheet metal sleeves 16—16.

In applying the clip in position, the electrode 7 is forced down over the post 2, the handle 4 assuming generally the position shown in dotted lines in Figure 1. In thus applying the electrode 7 to the post any coating or deposit thereon will be scraped off, whereby the electrode will make good electrical contact with the metal of the post and at the same time the third electrode 10, if used, will make a wiping or scraping contact with said post for the same purpose.

In thus applying the electrode 7 to the post 2 the resilient second electrode 8 will be flexed as shown in dotted lines Figure 1, the pressure thereof forcing the pointed end 9 through any deposit on the terminal 3 into good electrical contact with the metal thereof.

Upon now releasing the pressure on the handle 4, the resilience of the electrode 8 will cause the handle to assume the general position shown in full lines, thus tilting the electrode 7 and tightly gripping the post 2. It should be pointed out that the resilient spring 8, shown in Figure 1 in full lines, is still under tension so as to hold the clip in place. In other words, when the clip is removed from the battery the normal position of the electrode 8 will bring the pointed end 9 substantially below the relative position shown in Figure 1.

I have described above the preferred manner of constructing, applying and using my improved clip, since, for ease of application, it is preferable to make the ring electrode 7 large enough to fit readily over the post 2 so that when pressure on the handle 4 is released the resiliency of the second electrode 8 will cause the electrode 7 to assume the tilted position shown.

It will be understood, however, that the ring electrode 7 may be made so small in diameter that there will be but little clearance between it and the top of the post 2, in which case when the clip is applied, the ring 7 will be forced down on said post until it can go no further by reason of the taper thereof. In such case the ring electrode will not be tilted, but at the same time the second electrode 8 will be maintained under tension and the point 9 will be forced to penetrate any coating or deposit on the terminal 3. This latter and less desirable arrangement is referred to in order to indicate the scope of the appended claims.

With modern storage batteries, it is the practice to make the terminal posts of different size, in order that there may be assurance of the battery being properly charged. With battery clips as now commonly made, the terminal posts are engaged by means of spring pressed jaws or the like which may be applied with equal facility to either post. Hence it frequently happens, in testing batteries, that the two clips are wrongly applied. This makes it necessary either to make use of an ammeter of special construction or else, if error is made, to remove the clips and to reverse their connection with the battery. With my improved clip each ring electrode 7 is made to cooperate with its special battery post in the manner above explained. In other words, the rings are of different size so that the smaller ring will not fit over the larger post while the larger ring will not properly cooperate with the smaller post.

Furthermore, with my improved clip the engagement with the battery post is much firmer and a better electrical contact is secured than with clips employing spring pressed jaws or similar constructions. Obviously the clip having no movable parts, there is nothing to wear or become loose and for this reason the clip is of longer life than those employing pivoted jaws. Also by employing an insulated handle 4 for applying and removing the clip there is no danger to the operator from a live wire as is possible with clips employing metal jaws as at present.

It will be observed that the resilient electrode 8 presents at its end a point of substantially 45 degrees, whereas with clips as now made and used the corresponding voltage electrode is almost dagger-like in shape. As a result, the latter electrodes, after some months of use become badly corroded and dulled so that it is difficult to make proper contact with the battery terminal, especially if it is covered with a film or coating as is usually the case.

With my improved clip the very act of applying it requires that substantial pressure shall be exerted on the handle 4, causing the pointed end 9 to dig into and through any coating that may be encountered, so as to thereby make good electrical contact with the metal of the terminal. In fact, this pressure is sufficient to cause the pointed end to actually penetrate through a substantial thickness of insulation with which the connector straps may be covered, as is the case with certain types of storage batteries now on the market.

With electrodes of smaller diameter or so-called prods, the application of clamping jaws to the battery posts imposes but little pressure upon the pointed electrodes, so that good contact with the metal of the terminal is made only with difficulty, especially in cases where the terminal may be overlaid by a substantial thickness of insulating material.

While I prefer to construct my improved clip as shown in the drawing with an electrode 7 in the ammeter circuit and two electrodes 8 and 10 in the volt meter circuit, other arrangements may be made.

For instance, the resilient electrode 8 may be relied upon only for the purpose of performing its mechanical function of causing the ring electrode 7 to grasp the battery post as above described. In other words, the element 8 will then be a resilient arm or spring member performing no electrical function. In this case the electrodes 10 of the two clips will permit taking an overall voltage reading of the three cells under conditions of load.

It will be further understood that the third electrode 10 may be omitted and that the electrode 8 may be relied upon to perform only its mechanical function of locking the electrode 7 on the battery post, in which case there will be no voltage readings at all, but only readings of amperes. It will furthermore be understood that the electrode 7 may be employed to perform only its mechanical function of tightly grasping or clamping the battery post, in which case the electrodes 8 and 10 will permit the same voltage readings to be secured but not under conditions of load. With this latter arrangement the ring 7 may be entirely disconnected from any circuit or it may be connected with the same circuit as the electrode 10.

Finally it will be obvious that the insulated third electrode 10 may be omitted and the wire 15 connected directly to the current carrying circuit leading from ring 7.

I find, however, that with this latter arrangement the voltage reading is not as accurate as when a separate insulated third electrode is used, thus avoiding any disturbing influences due to the heavy current in the ammeter circuit.

Having now described my invention what I claim is new therein and desire to secure by Letters Patent is as follows:

1. An improved battery testing clip for use in testing batteries having two terminals, one of which is in the form of a post, said clip comprising a generally ring-shaped metallic member materially less in thickness than the height of said post and adapted to be forced in a tilted position down over said post so as to make a scraping or wiping contact therewith, and a second resilient metallic member connected therewith but insulated therefrom and making contact with the other battery terminal and placed under tension as the first mentioned member is forced down over said post, whereby said ring-shaped member will be held in engagement with the post solely by reason of its tilting engagement therewith, due to the resilient action of the second member.

2. An improved battery testing clip for use in testing batteries having two terminals, one of which is in the form of a post, said clip comprising a generally ring-shaped metallic electrode substantially larger than the diameter of said post and materially less in thickness than the height of said post and adapted to be forced in a tilted position down over said post so as to make a scraping or wiping contact therewith, and a second resilient metallic electrode carried thereby and insulated therefrom and making contact with the other battery terminal and placed under tension during the application of the first mentioned electrode, whereby its resiliency will cause said electrode to remain tilted and tightly clamp the battery post and thereby constitute the sole means by which both electrodes are maintained rigidly in contact with their respective terminals.

3. An improved battery testing clip for use in testing batteries having two terminals, one of which is in the form of a post, said clip comprising a handle, a generally ring-shaped metallic member carried by said handle, and materially less in thickness than the height of said post and adapted to be forced in a tilted position down over said post so as to make a scraping or wiping contact therewith and a second resilient metallic member also carried by said handle and insulated from the ring-shaped member and making contact with the other battery terminal and placed under tension as the first mentioned member is forced down over said post, whereby the tension of the resilient member will constitute the sole means by which the ring-shaped member is maintained in contact with said post.

4. An improved battery testing clip for use in testing batteries having two terminals, one of which is in the form of a post, said clip comprising a handle, a generally ring-shaped metallic member carried by said handle and materially less in thickness than the height of said post and adapted to be forced in a tilted position down over said post so as to make a scraping or wiping contact therewith, a second resilient electrode also carried by said handle insulated from the ring-shaped electrode and making contact with the other battery terminal and placed under tension during the application of the first mentioned electrode, whereby the tension of the second resilient electrode will constitute the sole means by which the ring-shaped electrode is maintained in contact with said post and a third electrode also carried by said handle insulated from the other electrodes and making contact with said post.

5. An improved battery testing clip for use in testing batteries having two terminals, one of which is in the form of a post, said clip comprising a handle, a flat metallic extension carried by said handle, a generally ring-shaped electrode integral with said extension and adapted to be forced in a tilted position down over said post so as to make a scraping or wiping contact therewith, said electrode being materially less in thickness than the height of said post and a second resilient electrode secured to said extension and insulated therefrom and making contact with the other battery terminal and placed under tension during the application of the first mentioned electrode.

6. An improved battery testing clip for use in testing batteries having two terminals one of which is in the form of a post, said clip comprising a handle, a flat metallic extension carried by said handle, a generally ring-shaped electrode integral with said extension and adapted to be forced in a tilted position down over said post so as to make a scraping or wiping contact therewith, said electrode being materially less in thickness than the height of said post, a second electrode secured to said extension and insulated therefrom and making contact with the other battery terminal and placed under tension during the application of the first mentioned electrode and a third electrode carried by said extension and insulated therefrom and in electrical contact with said post.

FLOYD F. HENRIOT.